April 10, 1951
W. M. SIMPSON
2,548,448
AIR CONDITIONING
Filed Feb. 18, 1947
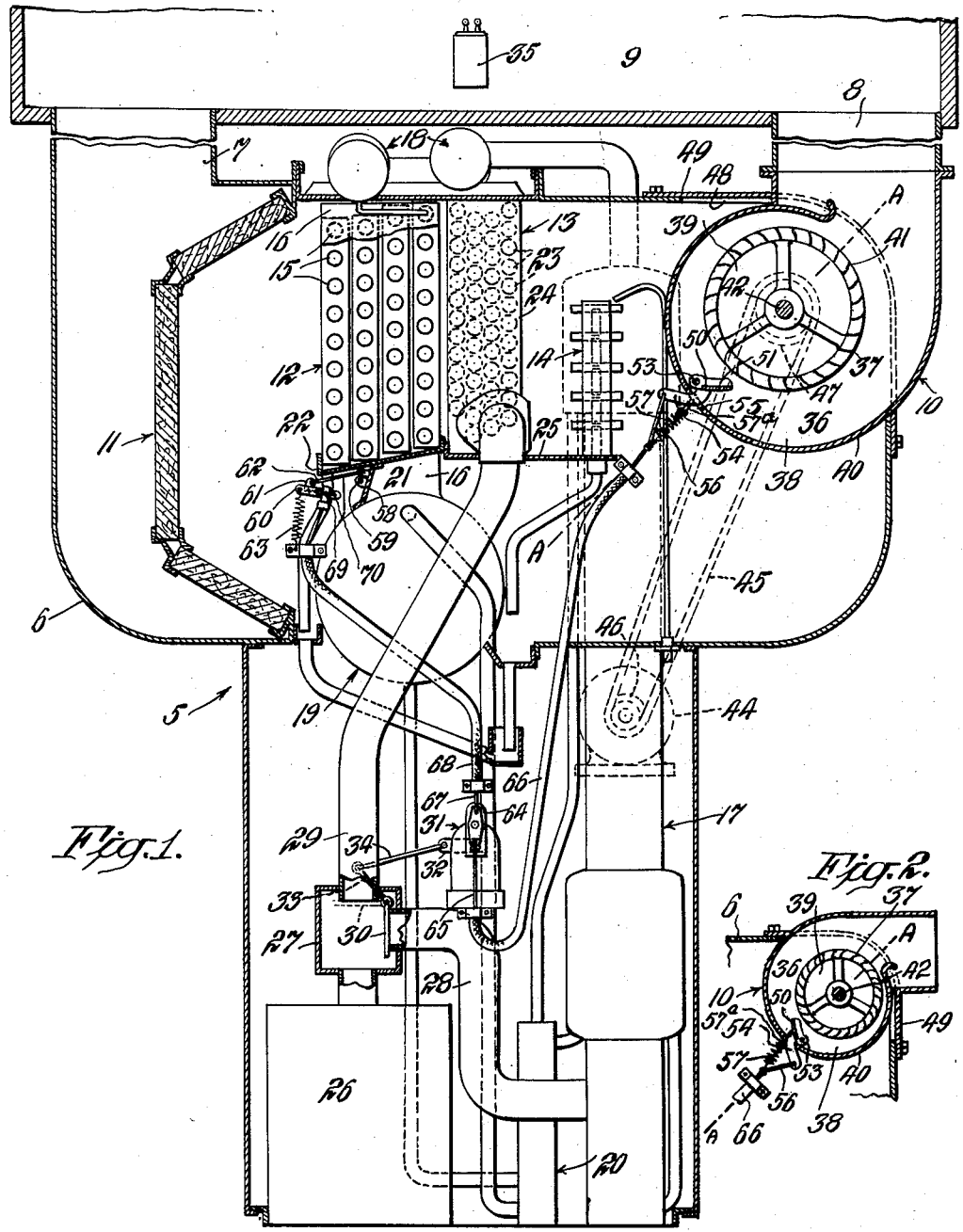
INVENTOR.
Walter M. Simpson
BY
Oliver S. Titcomb
his ATTORNEY Patented Apr. 10, 1951

2,548,448

UNITED STATES PATENT OFFICE 2,548,448

AIR CONDITIONING

Walter M. Simpson, Evansville, Ind., assignor to Servel, Inc., New York, N. Y., a corporation of Delaware Application February 18, 1947, Serial No. 729,345

11 Claims. (Cl. 257—9)

The present invention relates to an air conditioning system and more particularly to improvements in apparatus for regulating the flow of air to an enclosure to be conditioned of the type illustrated and described in a copending application for United States Letters Patent of Per Edberg Serial No. 727,076, filed February 7, 1947, and entitled Air Conditioning.

The air conditioner has a circulating fan which delivers air to an enclosure through a conditioning chamber where it is heated and humidified in winter or cooled and dehumidified in summer as required. When the conditioner is located in a region where the heating requirements in winter are the same as the cooling requirements in summer, the circulating fan will deliver the same amount of air to the enclosure to be conditioned when either heating or cooling. Such a balance of heating and cooling requirements, however, is rarely encountered in practice. In northern climes more heating than cooling is required. In southern climes more cooling than heating is required. In some installations all of the rooms are heated in winter while only some of the rooms are cooled in summer. In other installations the heating requirements are small while dehumidification by cooling is comparatively great.

Furthermore, when the conditioner is operating to cool the air in hot weather, it may be desirable to deliver a maximum amount of air to the enclosure even though it is not cooled to a degree possible with a lesser amount of air as the movement of air increases the comfort of the occupants in the enclosure. On the other hand, when the conditioner is operating to heat the air in cold weather all of the air delivered to the enclosure should be substantially heated before it is delivered to the enclosure as the circulation of air at room temperature is apt to produce a chilling effect upon the occupants.

The rate of operation of the heating and cooling systems and the speed and capacity of the fan may be initially adjusted for particular conditions when the air conditioner is installed. However, if the speed and capacity of the fan is adjusted to deliver the proper amount of air for a particular condition such as cooling, it may deliver too much air for heating. On the other hand, if the rate of operation of the heating system and capacity of the fan are adjusted to deliver a maximum amount of air for heating, the increased velocity and amount of air passing through the conditioning chamber may be too great for cooling. For example, the high velocity air may sweep moisture from the cooling element and into the air stream as fast as it is condensed from the air so that the air will not be properly dehumidified. Furthermore, the flow of air at high velocity may also interfere with the proper evaporation of refrigerant in the evaporator of the refrigeration system.

The principal object of the present invention is to provide an improved arrangement for regulating the rate of air circulation in accordance with the heating and cooling requirements for particular installations to increase the flexibility of the air conditioner to accommodate the particular conditions of each individual installation.

Another object is to provide a pivotally mounted baffle in the circulating fan casing adapted to be moved from a position adjacent the casing to an angular position with respect to the casing to change the operating characteristics of the fan and reduce its capacity.

Another object is to provide a simple and compact fan baffle of the type indicated which is operable by a small force and movement when the fan is arranged for either horizontal or vertical air delivery.

Another object is to provide an arrangement of the fan in the conditioner casing and fan baffle in the fan casing so that the fan baffle may be operated by a force applied in the same direction for either horizontal or vertical air delivery.

Another object is to provide a fan baffle of the type indicated which is adapted for operation in conjunction with a by-pass damper to regulate the rate of air circulation during heating and cooling, respectively.

Still another object is to provide a fan baffle of the type indicated adapted to be operated by the control mechanism for shifting the air conditioner from a heating to a cooling operation.

These and other objects will become more apparent from the following description and drawing in which like reference characters denote like parts in the several views. It is to be expressly understood, however, that the drawing is for the purpose of illustration only and not a definition of the limits of the invention, reference being had for this purpose to the appended claims.

In the drawing:

Figure 1 is a diagrammatic view of an air conditioner incorporating the air regulating apparatus of the present invention and showing the fan arranged for vertical air delivery.

Figure 2 is a view of a portion of the conditioning chamber showing the fan arranged for a horizontal delivery of air with the air regulating apparatus adapted for operation by a force applied in the same direction.

The air conditioner illustrated in the drawing is of unitary construction enclosed in a generally T-shaped casing 5. The upper part of the casing 5 comprises a conditioning chamber 6 and ducts 7 and 8 connect the chamber to the enclosure 9 to be conditioned. A circulating fan 10 in the chamber 6 draws air from the enclosure through the duct 7 and into the chamber and delivers the air back to the enclosure through the duct 8. Mounted in the conditioning chamber 6 in the direction of air flow is a filter 11, cooling element 12, heating element 13, humidifier 14, and fan 10. Thus, air in the enclosure 9 is filtered and then cooled and dehumidified or heated and humidified in accordance with requirements as it circulates through the conditioning chamber 6.

The cooling element 12 constitutes the evaporator of a suitable refrigeration system and comprises a plurality of rows of tubes 15 extending between headers 16 adjacent the side walls of the casing 5, the tubes of each row being provided with common heat transfer fins. As illustrated in the drawing, refrigerant is supplied to the cooling element or evaporator 12 by an absorption refrigeration system of the type illustrated and described in the United States Letters Patent to Albert R. Thomas, No. 2,282,503, issued May 12, 1942, and entitled Refrigeration. Suffice it to state herein that the refrigeration system comprises a generator 17, condenser 18, evaporator 12, absorber 19 and heat exchanger 20 interconnected for the circulation of refrigerant and absorbent when heat is supplied to the generator. The evaporator 12 overlies and is vertically spaced from the absorber 19 to provide opening 21 therebetween and the headers 16 extend down and are connected to the top of the absorber at opposite ends of the opening. Underlying the evaporator 12 is a combined drain pan and bottom wall 22 for directing the air to cause it to flow over the evaporator tubes 15.

The heating element 13 is in the form of a radiator and also comprises a plurality of closely adjacent tubes 23 extending between headers 24 adjacent the side walls of the casing 5. The heating element or radiator 13 is positioned closely adjacent the cooling element 12 in the conditioning chamber 6 and a wall 25 underlies the heating element and forms a continuation of the bottom wall 22 to the circulating fan 10.

Heating steam may be supplied from a steam boiler 26 to either the radiator 13 of the heating system or to the generator 17 of the refrigeration system. As illustrated diagrammatically in the drawing, steam is delivered from the boiler 26 to the chamber 27 of a selector valve and may be caused to flow to the generator 17 of the refrigeration system through the conduit 28 or to the radiator or heating element 13 through the conduit 29 as controlled by the movable valve element 30. The ends of the conduits 28 and 29 extend into the sides of the valve chamber 27 at right angles to each other and the movable valve element 30 is pivotally mounted for rocking movement from the full-line position to the dotted-line position illustrated. When the movable valve element 30 is in the full-line position illustrated, steam from the boiler 26 flows through the conduit 29 to the heating element 13. When the valve element 30 is shifted to the dotted-line position, it closes the conduit 29 so that steam is delivered through the conduit 28 to the generator 17. The valve element 30 is operated automatically by a servo-motor 31 having a crank-arm 32 connected to a crank-arm 33 for the valve element 30 by a link 34. Motor 31 is constructed to rotate only 180° when energized and its motion is transmitted through the crank-arm 32 and link 34 to rock the valve 30 from one to the other of its two positions. Operation of the motor 31 may be initiated by a suitable controller such as a combined selector and thermostat 35 in the enclosure 9 to be conditioned.

In accordance with the present invention the speed and capacity of the circulating fan 10 may be initially adjusted when the air conditioner is installed to produce the maximum capacity required for the particular installation. The present invention particularly provides an improved mechanism for further adjusting the fan to change its capacity when the conditioner is shifted from one conditioning operation to the other and to a construction and arrangement of elements so that the adjusting mechanism may be operated by a small force and movement applied in the same direction when the fan is positioned for either horizontal or vertical air delivery. The adjusting mechanism in accordance with the present improvement is arranged in the casing of the fan 10 and operable to an angular position to change the operating characteristics of the fan as distinguished from restricting the flow of air to the fan to change its capacity.

In the drawing a centrifugal type fan is illustrated which is of unitary construction comprising a scroll casing 36 and wheel 37 mounted for rotation in the casing. The scroll casing 36 has parallel side walls 38 with air inlet openings 39 and a curved peripheral wall 40. The wheel 37 is of hollow cylindrical form with blades 41 on its periphery and is positioned in the scroll positioned in the scroll casing 36 in alignment with the air inlet openings 39. The wheel 37 is mounted fast on a shaft 42 journaled in suitable bearings on the side walls of the conditioning chamber. The shaft 42 is driven by a motor 44 and belt 45 cooperating with pulleys 46 and 47 on the motor and fan shaft, respectively.

The speed and capacity of the circulating fan 10 is initially adjusted by selecting a motor driving pulley 46 and driven fan shaft pulley 47 of the proper sizes to give the desired speed ratio. Thus, the speed and capacity of the fan 10 may be initially adjusted to deliver the maximum amount of air required for the particular installation.

The fan 10 is mounted in the conditioner casing 5 in the manner illustrated and described in detail in my application for United States Letters Patent filed concurrently herewith to adapt it for either horizontal or vertical air delivery. Suffice it to state herein that the fan 10 is positioned in an opening 48 in the upper right-hand corner of conditioning chamber 6 as viewed in Fig. 1 and is mounted on the conditioner casing 5 by means of a cover plate 49 permanently attached to the sides 38 of the fan casing. The cover plate 49 overlies and is detachably bolted to the conditioner casing 5 at the sides of the opening 48. As illustrated in Fig. 1 of the drawing the fan is positioned for vertical air delivery but may be positioned for delivering air horizontally by merely removing the bolts, withdrawing the fan unit from the conditioner casing 5, turning it 180° about the diagonal line A—A as an axis, reinserting the unit in the opening 48 in the casing and bolting the cover plate 49 to the conditioner casing 5. The outlet from the scroll casing 36 will then extend horizontally, see Fig. 2, and it is only necessary to change the direction of rotation of the wheel 37 which may be reversed by reversing the direction of rotation of the driving motor 44.

The fan 10 also may be adjusted by a movable baffle 50 to reduce its capacity when the air conditioner is shifted from a heating to a cooling operation or vice versa. The baffle 50 is mounted in the casing 36 of the fan 10 at a position on the diagonal line A—A and comprises a sheet metal plate portion curved to conform to the curvature of the peripheral wall 40 and extending throughout the width of the fan casing. At opposite ends of the baffle 50 are flanges 51 which extend at right angles to the plate portion adjacent to the side walls 38 of the fan casing. Flanges 51 project beyond one edge of the plate portion and are shaped to provide ears 52. The baffle 50 is pivotally mounted on a pivot rod 53 extending through the ears 52 and into the parallel side walls 38 of the fan casing. An actuating arm 54 projects from the rear of the plate portion of the baffle 50 through a slot 55 in the peripheral wall 40 of the fan casing and the arm has an arcuate portion adjacent the plate which curves about the pivot rod 53 as an axis and a straight portion extending from the curved portion.

The fan baffle 50 is operated in both directions by a link 56. One end of the link 56 is connected to the end of the actuating arm 54 and its opposite end is connected to the outer end of the tension spring 57. Spring 57 is positioned along the diagonal link A—A with its inner end connected to the fan casing by clip 57a. When the connected ends of the link 56 and 57 are pulled to the position illustrated in the drawing the baffle 50 is rocked clockwise and projects at an angle to the peripheral wall 40 of the fan casing to change the operating characteristics of the fan and reduce the capacity or amount of air delivered by the fan. When the connected ends of the link 56 and spring 57 are released the baffle 50 is rocked counter-clockwise by the spring from the position shown in the drawing to a position closely adjacent the side and peripheral walls 38 and 40 of the fan casing so that the fan 10 will operate at maximum capacity for the particular constant speed at which the fan is initially adjusted.

The opening 21 between the evaporator 12 and absorber 19 constitutes a by-pass around the cooling and heating elements 12 and 13 through which a portion of the circulating air may flow to the fan 10 and the by-pass may be opened or closed by a damper 58. The damper 58 extends longitudinally throughout the length of the opening 21 and is pivotally mounted for rocking movement on a pivot rod 59. The damper 58 is operated to open or close the by-pass opening 21 by an actuating lever 60 having a crank-arm 61 connected to the damper by a link 62. A spring 63 connected to one end of the actuating lever 60 rocks the latter counter-clockwise to close the by-pass damper 58 and yields when the lever is rocked clockwise to open the damper. Damper 58 restricts the flow of air when closed and thereby cooperates with the fan baffle 50 to change the capacity of the fan 10.

The fan baffle 50 and by-pass damper 58 may be operated simultaneously by the servo-motor 31 when the air conditioner is shifted from heating to cooling, or vice versa. For this purpose the servo-motor 31 is provided with a crank-arm 64 at the opposite end of its shaft from the crank-arm 32. The crank-arm 64 is connected to operate the fan baffle 50 by a flexible cable 65 enclosed in a cable housing 66. The opposite ends of the cable housing 66 are suitably clamped in fixed position and one end of the cable 65 is connected to the crank-arm 64 of the servo-motor 31 and the opposite end attached to the connected ends of the link 56 and spring 57.

The crank arm 64 of the servo-motor 31 is also connected to operate the by-pass damper 58 by a similar cable 67 enclosed in a cable housing 68. The cable 67 is connected to the crank at one end and to the actuating lever 60 for the by-pass damper 58 at its opposite end. The end of the cable 65 is first connected to the link 56 and spring 57 and then drawn through the cable housing 66 until the fan baffle 50 is in the position to give the desired capacity to the fan for the particular condition after which the end of the cable is attached to the crank-arm 64 of the servo-motor 31. The end of the cable 67 is adjustably connected to the actuating lever 60 by a pin and slot connection 69 and 70. Therefore, the fan baffle 50 and by-pass damper 58 may be operated to any desired position by the servo-motor 31.

As illustrated in the drawing the fan baffle 50 and by-pass damper 58 are shown in a fully closed position with the selector valve element 30 adjusted to supply steam to the heating element or radiator 13. With this arrangement the fan baffle 50 and by-pass damper 58 are additive to reduce the capacity of the fan when heating to insure adequate heating of the air and increase the amount of air circulated when cooling. It will be understood, however, that the extent of movement of the fan baffle 50 and by-pass damper 58 can be decreased; the baffle and damper arranged to open instead of close on heating; or only one or the other of the baffle and damper connected to be operated by the servo-motor 31 to adapt the air conditioner for the particular operating conditions. One form of the invention having now been described in detail the mode of operation of the particular arrangement illustrated is explained as follows.

For the purpose of description, let it be assumed that neither the heating nor cooling system of the air conditioner is in operation and that the selector valve element 30, by-pass damper 58 and fan baffle 50 are in the full-line positions illustrated indicating a winter condition. Upon a decrease in the temperature of the air in the enclosure 9, heat is supplied to the boiler 26 to generate steam therein. Steam from the boiler 26 flows through the valve chamber 27 and conduit 29 to the heating element or radiator 13. Preferably, the operation of the fan 10 is delayed until steam has been supplied to the radiator 13 at which time air will be drawn from the enclosure 9 through the duct 7, conditioning chamber 6 including the evaporator 12, radiator 13, humidifier 14, fan 10 and duct 8 back into the enclosure.

As the fan baffle 50 is moved to its angular closed position with respect to the fan casing it changes the operating characteristics of the fan 10 to reduce its capacity and, therefore, the amount of air circulated in the enclosure 9. Furthermore, as the by-pass damper 58 is closed, all of the air from the enclosure 9 is directed through the tubes 15 and 23 of the evaporator 12 and radiator 13 which offer considerable resistance and further reduces the capacity of the fan 10 and the rate of air flow. As all of the tubes 23 of the radiator 13 are filled with steam and as the tubes extend over the entire cross-sectional area of the path of flow, all of the air passing through the conditioning chamber 6 will be substantially heated before it enters the fan 10. Thus, when the heated air is delivered to the enclosure 9, it will not produce any chilling effect upon the occupants and will gradually increase the temperature of the air in the enclosure as it diffuses with the air therein. The air conditioner continues to operate periodically in the manner described to maintain the temperature in the enclosure within predetermined limits.

When the seasons change and it is desired to cool the enclosure 9, the instrument 35 is operated either automatically or manually to energize the servo-motor 31 to cause it to rotate 180°. Upon rotation of the motor shaft, the crank 32 operating through the link 34 and crank-arm 33 shifts the diverter valve 30 from the position illustrated in full lines to that illustrated in dotted lines. The crank 64 of the servo-motor 31 also operates through the cable 65 to release the link 56 and actuating arm 54 for operation by the spring 57 to rock the fan baffle 50 to its retracted or open position. Simultaneously, the crank-arm 64 operates through the cable 67 to rock the actuating lever 60 to open the by-pass damper 58 against the action of the spring 63.

As the temperature of the enclosure 9 increases, heat is supplied to the boiler 26 and steam generated therein is delivered through the valve chamber 27 and conduit 28 to the generator 17 to supply refrigerant to the evaporator or cooling element 12. The fan 10 is initiated simultaneously with the supplying of the heat to the boiler 26 to circulate air from the enclosure 9 through the conditioning chamber 6. However, during a cooling operation, a portion of the air flows through the by-pass opening 21 without restriction which decreases the resistance to flow and increases the capacity of the fan 10. The capacity of the fan 10 also is increased by retracting the baffle 50 so that a greater amount of air is circulated from the enclosure 9 and through the air conditioner. The movement of an increased amount of air in the enclosure 9 produces a cooling effect upon the occupants therein.

When the fan 10 is mounted for horizontal instead of vertical air delivery the actuating arm 54 and link 56 for operating the fan baffle 50 will be positioned on the opposite side of the diagonal line A—A from that shown in the drawing, see Fig. 2. However, as the spring 57 and end of the cable 65 are located on the diagonal line A—A the direction of application and amount of force required will remain the same and due to the construction and pivotal mounting of the fan baffle 50 it may be operated by a small force and movement. Furthermore, the arrangement of the baffle 50 in the casing of fan 10 changes the operating characteristics of the fan 10 as distinguished from restricting the air flow to the fan and is very effective in controlling the capacity of the fan.

It will now be observed that the present invention increases the flexibility of an air conditioner system to adapt it for varying conditions encountered in particular installations. It will further be observed that the present invention provides a simple and compact fan baffle arrangement for effectively changing the capacity of a circulating fan when shifting from one conditioning operation to another by the application of a small force and movement applied in the same direction for either vertical or horizontal air delivery. It will still further be observed that the present invention provides an arrangement for automatically changing the capacity of the circulating fan when the conditioner is shifted from a heating to a cooling operation or vice versa.

While a single embodiment of the invention is herein illustrated and described, it is to be understood that modifications may be made in the construction and arrangement of elements as previously explained without departing from the spirit or scope of the invention. Therefore, without limiting myself in this respect, the invention is defined by the following claims.

I claim:

1. In an air conditioner, a conditioning chamber, a fan for delivering air through the conditioning chamber to an enclosure to be conditioned, a heating system for heating air in the conditioning chamber, a refrigeration system for cooling air in the conditioning chamber, a controller for selecting either the heating system or the refrigeration system for operation, said fan having a casing, a baffle pivotally mounted in the fan casing and having the same contour as the casing to adapt it to fit closely adjacent the sides thereof, and mechanism operated by the controller for rocking the baffle to an angular position with respect to the fan casing to reduce the capacity of the fan.

2. In an air conditioner, a conditioning chamber, a fan for delivering air through the conditioning chamber to an enclosure to be conditioned, said fan having a casing and a rotatable element in the casing, a heating system for heating air in the conditioning chamber, a refrigeration system for cooling air in the conditioning chamber, a controller for selecting either the heating system or the refrigeration system for operation, a baffle in said fan casing, means for mounting the baffle for rocking movement in the fan casing, and mechanism operated by the controller for rocking the baffle to an angular position with respect to the fan casing to change the capacity of the fan, said mechanism being initially adjustable to rock the baffle to any angular position in the casing.

3. In an air conditioner, a conditioning chamber, a fan for delivering air through the conditioning chamber to an enclosure to be conditioned, said fan having a casing and a rotatable element in the casing, a heating system for heating air in the conditioning chamber, a refrigeration system for cooling air in the conditioning chamber, a controller for selecting either the heating system or the refrigeration system for operation, a baffle pivotally mounted in the fan casing and having an operating arm extending through the casing, a link connected to the end of the operating arm, a spring connected between the link and fan casing, and a flexible cable connected to the spring and link and operated by the controller whereby to rock the baffle to an angular position with respect to the fan casing when the cable is pulled against the action of the spring and rock the baffle to a position closely adjacent the fan casing under the action of spring when the cable is released.

4. In an air conditioner, a conditioning chamber, a fan for delivering air through the conditioning chamber to an enclosure to be conditioned, said fan having a casing and a rotatable element in the casing, a heating system for heating air in the conditioning chamber, a refrigeration system for cooling air in the conditioning chamber, a controller for selecting either the heating system or the refrigeration system for operation, a baffle pivotally mounted in the fan casing, and mechanism operated by the controller for rocking the baffle to an angular position with respect to the fan casing when the heating system is in operation and to a position closely adjacent the fan casing when the cooling system is in operation.

5. In an air conditioner, a casing forming a generally rectangular conditioning chamber, a centrifugal fan having a scroll casing mounted in an opening in a corner of the conditioning chamber, said fan casing being adapted to be mounted in the opening in the conditioning chamber for either horizontal or vertical air delivery by bodily rotating the fan about an axis diagonal to the two directions of air flow, a baffle positioned in the fan casing on said diagonal axis, said baffle being pivotally mounted for rocking movement from a position closely adjacent the casing to an angular position with respect to the casing to change the capacity of the fan, and mechanism for operating the baffle by movement applied in the same direction when the fan is mounted in the conditioning chamber for either horizontal or vertical air delivery.

6. In an air conditioner, a casing forming a generally rectangular conditioning chamber, a centrifugal fan having a scroll casing mounted in an opening in a corner of the conditioning chamber, said fan casing being adapted to be mounted in the opening in the conditioning chamber for either horizontal or vertical air delivery by bodily rotating the fan about an axis diagonal to the two directions of air flow, a baffle in the fan casing for changing the capacity of the fan, said baffle having the same contour as the fan casing to adapt it to lie closely adjacent thereto and an actuating arm extending outwardly from the baffle through the fan casing for rocking the baffle to an angular position with respect to the casing, said arm extending at opposite sides of the diagonal axis when the fan is mounted for horizontal or vertical air delivery respectively, and force applying means arranged along the diagonal axis and connected to operate the actuating arm when positioned on either side thereof.

7. In an air conditioner, a casing forming a generally rectangular conditioning chamber, a centrifugal fan having a scroll casing mounted in an opening in a corner of the conditioning chamber, said fan casing being adapted to be mounted in the opening in the conditioning chamber for either horizontal or vertical air delivery by bodily rotating the fan about an axis diagonal to the two directions of air flow, a baffle pivotally mounted in the fan casing, said baffle having the same contour as the fan casing to adapt it to lie closely adjacent thereto and an actuating arm extending outwardly from the baffle through the fan casing, a link connected at one end to the actuating arm, a spring connecting the opposite end of the actuating arm to the fan casing, a flexible cable connected to the spring and link for rocking the baffle to an angular position with respect to the casing when the cable is pulled to reduce the capacity of the fan, said spring rocking the baffle to a position adjacent the fan casing when the cable is released, and said cable and spring being positioned along said diagonal axis.

8. In an air conditioner, a casing forming a generally rectangular conditioning chamber, a heating system for heating air in the conditioning chamber, a refrigeration system for cooling air in the conditioning chamber, a controller for selecting either the heating system or refrigeration system for operation, a centrifugal fan having a scroll casing mounted in an opening in a corner of the rectangular conditioning chamber, said fan casing being adapted to be mounted in the opening in the conditioning chamber for either horizontal or vertical air delivery by bodily rotating the fan about an axis diagonal to the two directions of air flow, a baffle in the fan casing for changing the capacity of the fan, and mechanism operated by the controller for rocking the baffle to an angular position with respect to the fan casing when the latter is mounted in the conditioning chamber for either horizontal or vertical air delivery.

9. In an air conditioner, a conditioning chamber, a fan for delivering air through the conditioning chamber to an enclosure to be conditioned, said fan having a casing and a rotatable element in the casing, a heating system for heating air in the conditioning chamber, a refrigeration system for cooling air in the conditioning chamber, a selective controller for selecting either the heating system or refrigeration system for operation, a pivotally mounted baffle in the fan casing for changing the capacity of the fan, a damper for restricting the flow of air through the conditioning chamber, and mechanism operated by the controller for actuating the fan baffle and damper.

10. In an air conditioner, a conditioning chamber, a fan for delivering air through the conditioning chamber to an enclosure to be conditioned, said fan having a casing and a pivotally mounted baffle therein, a damper in the conditioning chamber for increasing the resistance to flow when closed and decreasing the resistance to flow when open, a heating system for heating air in the conditioning chamber, a refrigeration system for cooling air in the conditioning chamber, a controller for selecting either the heating system or cooling system for operation, and mechanism operated by the controller to move the fan baffle and damper whereby to deliver a maximum amount of air when the cooling system is in operation and decrease the amount of air delivered when the heating system is in operation.

11. In an air conditioner, a conditioning chamber, a fan for delivering air through the conditioning chamber to an enclosure to be conditioned, heat exchange means in said conditioning chamber, apparatus for supplying either a heating medium or a cooling medium to the heat exchange means, a selective controller for controlling said apparatus to shift from heating to cooling, said fan having a casing, a baffle mounted in the fan casing for movement from one to the other of two positions in said casing to change the capacity of the fan, and means connecting the controller and baffle for moving the baffle to change the capacity of the fan when shifting from heating to cooling or vice versa.

WALTER M. SIMPSON.

REFERENCES CITED

The following references are of record in the file of this patent:

UNITED STATES PATENTS

| Number | Name | Date |
|---|---|---|
| 1,928,331 | Downs | Sept. 26, 1933 |
| 2,001,522 | Chester | May 14, 1935 |
| 2,352,930 | Anderson | July 4, 1944 |